Dec. 2, 1969     J. A. HUGHES     3,481,280
MONORAIL ASSEMBLY
Filed March 27, 1967
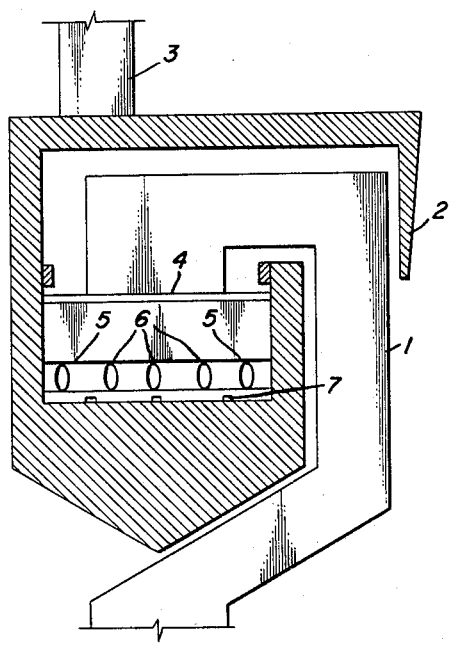
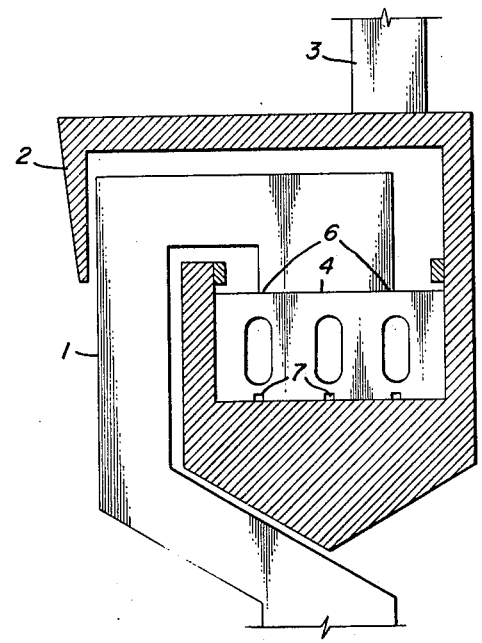
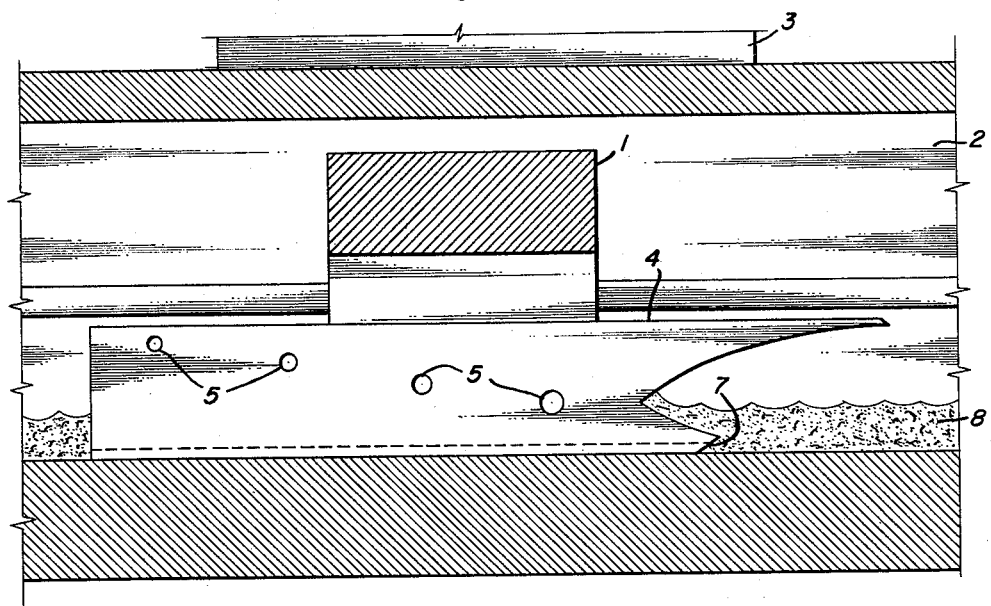
INVENTOR.
JAMES ALVA HUGHES United States Patent Office 3,481,280
Patented Dec. 2, 1969

3,481,280
MONORAIL ASSEMBLY
James Alva Hughes, 3815 Avenue E,
Kearney, Nebr. 68847
Filed Mar. 27, 1967, Ser. No. 626,219
Int. Cl. B61b 13/04; A63g 21/20; B60k 9/00
U.S. Cl. 104—118
1 Claim

ABSTRACT OF THE DISCLOSURE

A uni-rail transportation device comprising a monorail assembly upon which a slidable shoe comprising a bar is supported the shoe supporting a depending coach comprising an element of a vehicular train movable along the monorail, and the monorail assembly having a track with a G-cross sectional configuration.

The purpose of the invention is to increase speed and safety in uni-rail mode of transportation and thereby help alleviate traffic problems in congested areas. The above-named invention is thought by the inventor to be very practical for the following reasons: very simple mechanically, low cost maintenance and able to obtain high speeds with great safety on short runs.

A brief description of the invention is as follows:

FIGURE 1 is a forward view of speed bar with connecting arm inside of G-configurated rail.

FIGURE 2 is a rear view of speed bar showing exit ports with connecting arm and G-configurated rail.

FIGURE 3 is a side view of G-configurated rail and speed bar with side ports, lubricating compound and connecting arm.

Following is a detailed description of the G-configurated rail and speed bar.

FIGURE 1 is a view looking at the forward end of the speed bar and cross section of G-configurated rail with supporting arm which is labeled 1, which extends up and across and down to support train; 2 is G-configurated rail made from railroad type steel rail showing overhanging extension which acts as dust shield and moisture guard. 3 is connecting part that extends upward from G-configurated rail track to supporting arm and braces that will keep the G-configurated rail track suspended in the air at a height of approximately 24 feet. 5 and 6 are lubricating compound ports on the forward end of the speed bar. 4 is speed bar which acts as bearing support for train. 7 are grooves in the bottom of the speed bar to let the lubricating compound help give rise and lubrication to the underneath section of the speed-bar.

FIGURE 2 is a reversed view of FIGURE 1. 6 is exit cooling ports for speed bar.

FIGURE 3 is a side view of speed bar and G-configurated rail. 5 are exit orifices where lubricating compound is forced out while speed bar is in motion, the forward orifices pick up part of the lubricating compound, which is forced in the front and back out the sides of the speed bar to help lubricate the sides of the speed bar and G-configurated rail in order to cut down the friction. 8 is lubricating compound.

The following is the invention claim:

1. In a uni-rail transportation structure, the combination of a monorail assembly and a vehicular train movable in depending position along said monorail assembly, said monorail assembly comprising a horizontal track having a G-cross sectional configuration, a plurality of spaced apart supports secured to the upper side of said track for supporting said track in elevated position above the ground, said vehicular train comprising a plurality of conventional coaches enjoined together to form said train, said coaches having shoes slidable along said track, each shoe comprising a bar at the upper end of a support that is secured at its lower end to the upper part of said coach, each said bar having a plurality of ports at a forward end thereof and a plurality of ports along opposite sides thereof, said ports comprising means to eject lubricating compound from within said bar, and said bar having a plurality of parallel longitudinal grooves on the underside thereof for receiving said lubricating compound ejected from said ports so to decrease friction between said bar and said track.

References Cited

UNITED STATES PATENTS

| | | | |
|---|---|---|---|
| 536,357 | 3/1895 | De Palacio | 104—139 |
| 1,441,126 | 1/1923 | Sherman et al. | 104—134 |

ARTHUR L. LA POINT, Primary Examiner

RICHARD A. BERTSCH, Assistant Examiner

U.S. Cl. X.R.

104—24, 134, 138